United States Patent [19]

Micic et al.

[11] 4,139,860

[45] Feb. 13, 1979

[54] TELEVISION RECEIVER EQUIPPED FOR SIMULTANEOUSLY SHOWING SEVERAL PROGRAMS

[75] Inventors: Ljubomir Micic; Hermannus Schat, both of Freiburg; Laurin C. Freyberger, Waldkirch; Manfred F. Ullrich, Denzlingen, all of Fed. Rep. of Germany

[73] Assignee: ITT Industries, Inc., New York, N.Y.

[21] Appl. No.: 806,639

[22] Filed: Jun. 15, 1977

[30] Foreign Application Priority Data

Jun. 25, 1976 [DE] Fed. Rep. of Germany ....... 2628737

[51] Int. Cl.² .............................................. H04N 5/22
[52] U.S. Cl. ...................................... 358/22; 358/181; 358/183
[58] Field of Search .................. 358/22, 183, 182, 181

[56] References Cited

U.S. PATENT DOCUMENTS

| | | | |
|---|---|---|---|
| 3,652,790 | 3/1972 | Eberhardt | 358/183 X |
| 3,710,017 | 1/1973 | Abe et al. | 358/183 |
| 3,943,280 | 3/1976 | Kimura et al. | 358/183 |
| 4,070,695 | 1/1978 | Scholz et al. | 358/181 |

FOREIGN PATENT DOCUMENTS

| | | | |
|---|---|---|---|
| 2413839 | 9/1975 | Fed. Rep. of Germany | 358/183 |
| 2540965 | 3/1977 | Fed. Rep. of Germany | 358/183 |

Primary Examiner—Robert L. Griffin
Assistant Examiner—Aristotelis M. Psitos
Attorney, Agent, or Firm—John T. O'Halloran; Peter C. Van Der Sluys

[57] ABSTRACT

This relates to apparatus for the "picture on picture" or "program check" project. Storage, storage control circuits and clock signal generators are disclosed. The storage consists of two parts which are simultaneously fed by selected lines of the second program.

10 Claims, 6 Drawing Figures

FIG. 2

TELEVISION RECEIVER EQUIPPED FOR SIMULTANEOUSLY SHOWING SEVERAL PROGRAMS

BACKGROUND OF THE INVENTION

This relates to a television receiver comprising a screen on which there is displayed a selected first program in the form of a large-size picture, and simultaneously a further program on the same screen.

The present invention contemplates a television receiver for displaying a selected first program as a large size picture on a television screen, while simultaneously displaying a second program in a small image sector of the screen. The television receiver contains a storage device in which the picture contents of the second program is stored with a reduced number of lines. Storage is facilitated by filtering out the vertical and horizontal synchronizing pulses to direct the picture contents into defined storage positions, after which the contents may be made visible at least partly in the small image sector of the larger size screen. First and second tuners are respectively associated with the first and second program contents and are coupled respectively to first and second IF stages that feed first and second IF demodulators. First and second partial storage means each have an input connected to the second IF demodulator. An electronic switch has a first input coupled to the output of said first partial storage means and a second input coupled to the outlet of the second partial storage means and a second electronic switch has a first input coupled to the output of the first electronic switch and a second input coupled to the output of the first IF demodulator. A video amplifier has an input coupled to the output of said second electronic switch and logic means are used for controlling said first and second electronic switches and said first and second partial storages in response to the vertical and horizontal synchronizing pulses of said second program and to the vertical synchronizing and horizontal flyback pulses of the first program.

A television receiver for displaying a selected first program in the form of a large size picture and simultaneously displaying a further program in an image sector of the first program such that at least one image sector of the further program becomes visible on a screen in the form of a small size picture, said television receiver containing a storage device in which the picture contents of said further program, with a reduced number of lines, is first stored, with the aid of the filtered out vertical and horizontal synchronizing pulses, into defined storage positions and thereafter made visible at least partly in a corresponding position in said large size picture, comprising: a first tuner associated with said first program; a second tuner associated with said further program; a first IF stage coupled to the output of said first tuner; a second IF stage coupled with the output of said second tuner; a first IF modulator coupled to the output of said first IF stage; a second IF modulator coupled to the output of said second IF stage; first and second partial storages each having an input coupled to the output of said second IF demodulator; a first electronic switch having a first input coupled to the output of said first partial storage and a second input coupled to the output of said second partial storage; a second electronic switch having a first input coupled to the output of said first electronic switch and a second input coupled to the output of said first IF demodulator; a video-amplifier having an input coupled to the output of said second electronic switch; and logic means for controlling said first and second electronic switches and said first and second partial storages, said logic means responsive to the vertical and horizontal synchronizing pulses of said further program and to the vertical synchronizing pulses and the horizontal flyback pulses of said first program.

The above and other objects of the present invention will be more clearly understood from the following detailed description taken in conjunction with the accompanying drawings, in which

BRIEF DESCRIPTION OF THE DRAWINGS

FIG. 2 is a block diagram of one embodiment of a television receiver according to the invention;

DESCRIPTION OF THE PREFERRED EMBODIMENT

Figure 1:
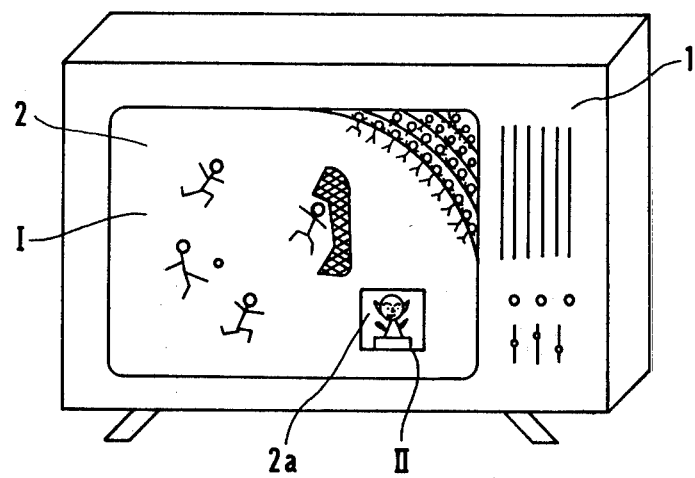
FIG. 1 schematically shows the front view of a television receiver according to the present invention.

FIG. 1 shows the result obtainable for the viewer on a screen 2 of a television receiver 1, namely that the program I is visible on the majority of the screen 2 in the form of a large-size picture, for example, a football or soccer match, while in one image sector 2a, in the form of a small-size picture, a further program II is visible.

Figure 2:
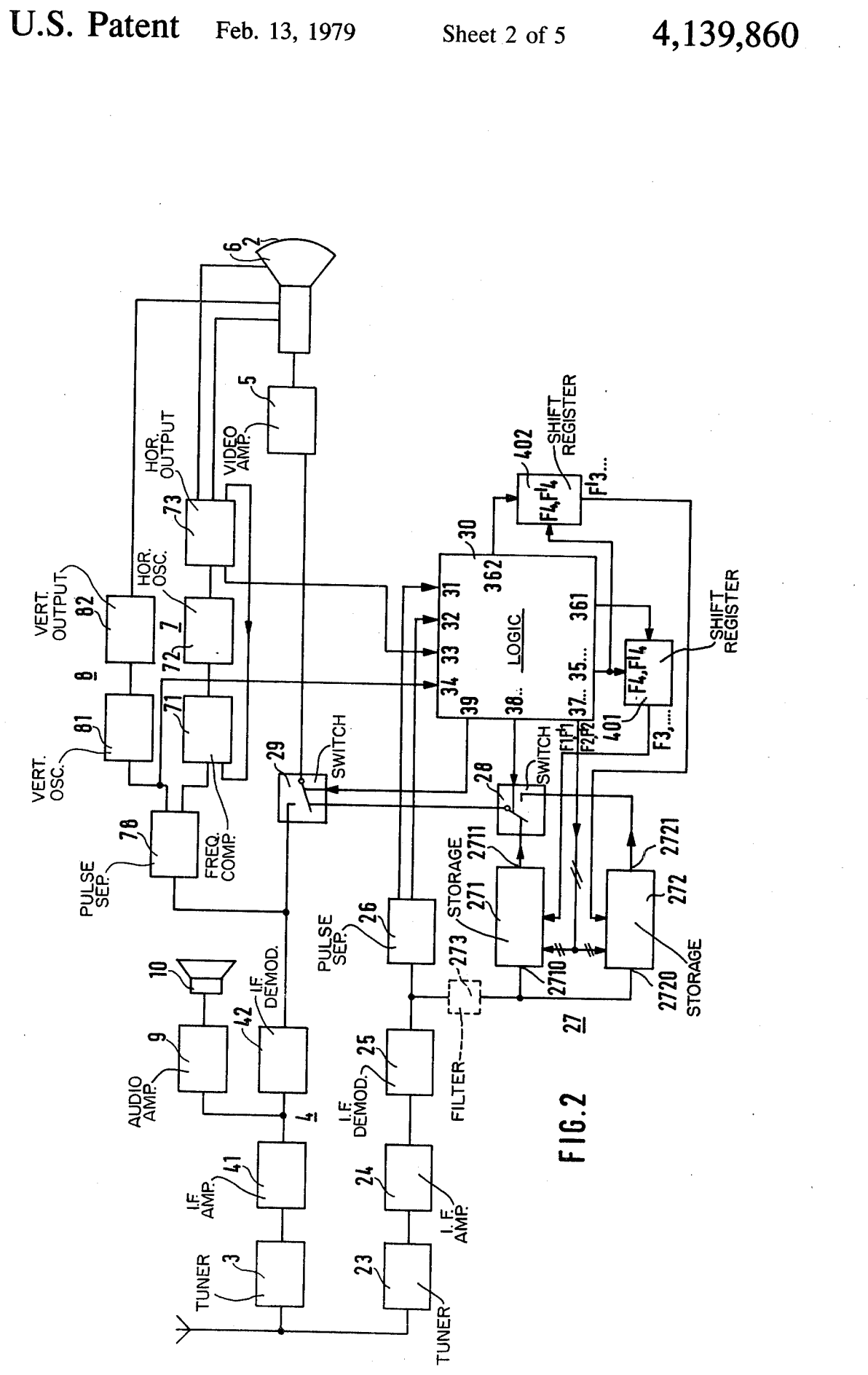

The block diagram in FIG. 2 of an embodiment of a television receiver according to the invention, shows all of the circuit stages necessary for a black-and-white television receiver, and for the sake of completeness, there are also shown those circuit parts which are normally provided for in black-and-white television receivers. The invention, however, is in no way restricted to the use with black-and-white television receivers, but is equally well suitable for application to color television receivers. For the sake of clarity, however, stages which are provided for in color television receivers have not been shown in FIG. 2.

The individual circuit stages with the exception of stage 29 shown in the upper half of FIG. 2, correspond to those of a conventional television receiver, whereas the circuit stages shown in the lower half of FIG. 2, including the stage 29, are those additionally provided for according to the invention.

The signal path for the large-size picture consists of a tuner 3, an IF amplifier 4 with the actual IF stage 41 and a subsequently arranged IF demodulator 42, a video amplifier 5, and the picture tube 6. Between the IF stage 41 and the IF demodulator 42 there is taken the IF signal for the audio amplifier 9 and the subsequently arranged loudspeaker 10. The composite video (BAS) signal which is capable of being taken off the output of the IF demodulator 42 and which, in the case of color television receivers, the so-called color composite video signal, still containing the color information, etc., is fed to the video amplifier 5 and to the synchronizing pulse separating stage 78 which, in a manner known produces the horizontal and vertical synchronizing pulses.

The horizontal synchronizing pulses serve to synchronize the horizontal deflection circuit 7 consisting of phase and/or frequency comparator 71, a horizontal oscillator 72 and horizontal output stage 73, with a signal corresponding to the frequency of the horizontal oscillator, for example, a signal taken from the horizontal output stage, being fed to the phase and/or frequency comparator.

The picture synchronizing pulses synchronize the vertical deflection stage 8 comprising a vertical oscillator 81 and a vertical output stage 82. The output signals of the vertical output stage 82 and of the horizontal output stage 73, which in addition thereto, produces the necessary high tension for the picture tube, are fed to the deflecting coils of the picture tube 6.

The signal path for the small-size picture consists of a second tuner 23, of a second IF stage 24 with the subsequently arranged second IF demodulator 25, of the storage device 27 consisting of two partial storages 271, 272, of a first electronic switch 28, a second electronic switch 29 and a logic circuit 30 controlling the storage device 27 partly directly, and partly via the shift registers 401, 402, and the two switches 28, 29. Moreover, for forming the horizontal and vertical synchronizing pulses for the further program II, there is provided a second synchronizing pulse separating stage 26.

If, for the sake of simplicity, the stages in the small-size picture signal path for the tuner 23, i.e. the IF stage 24 and the IF demodulator 24 are chosen to be of identical design as those for the tuner 3 (the IF stage 41 and the IF demodulator 42), a filter 273, preferably a low-pass filter, must be provided between the output of the second IF demodulator 25 and the two inputs of the partial storage devices 271, 272, which filter then serves to suppress the color subcarrier frequency. This filter 273, on the other hand, may be omitted when the second tuner 23, the second IF stage 24 and the second IF demodulator 25 are dimensioned to be so narrow-banded that this alone will suppress the color subcarrier frequency.

Anyhow, each of the inputs 2710, 2720 of the two partial storages 271, 272 is coupled to the output of the second IF demodulator 25, so that the composite video signal of the further program II is permanently available at these inputs.

The output 2711 of the first partial storage 271 and the output 2721 of the second partial storage 272 are both applied to the two switch inputs of the first electronic switch 28, whose switch control input is connected to the output 38 of the logic circuit 30. The switch output of the first electronic switch 28 extends to the one switch input of the second electronic switch 29 whose other switch input is connected to the output of the first IF demodulator 42. The switch output of the second electronic switch 29 extends to the input of the video amplifier 5 while the switch control input of the second electronic switch 29 is connected to the output 39 of the logic circuit 30.

Accordingly, in dependence upon the switch position of the two electronic switches 28, 29, either the composite video signal of the large-size picture or one of the small-size picture signals as stored in the partial storages 271, 272, is fed to the video amplifier 5.

The two partial storages 271, 272, are controlled by the clock signal output 37 (in FIG. 5: 371, 372, 373, 374) of the logic circuit 30, which, for this purpose, produces two different clock signals F1, F'1; F2, F'2, as will be explained in greater detail hereinafter. Furthermore, third clock signals F3..., F'3... are applied to the two partial storages 271, 272, with these clock signals being generated by the shift registers 401, 402 in a way likewise to be described hereinafter.

Figure 3:
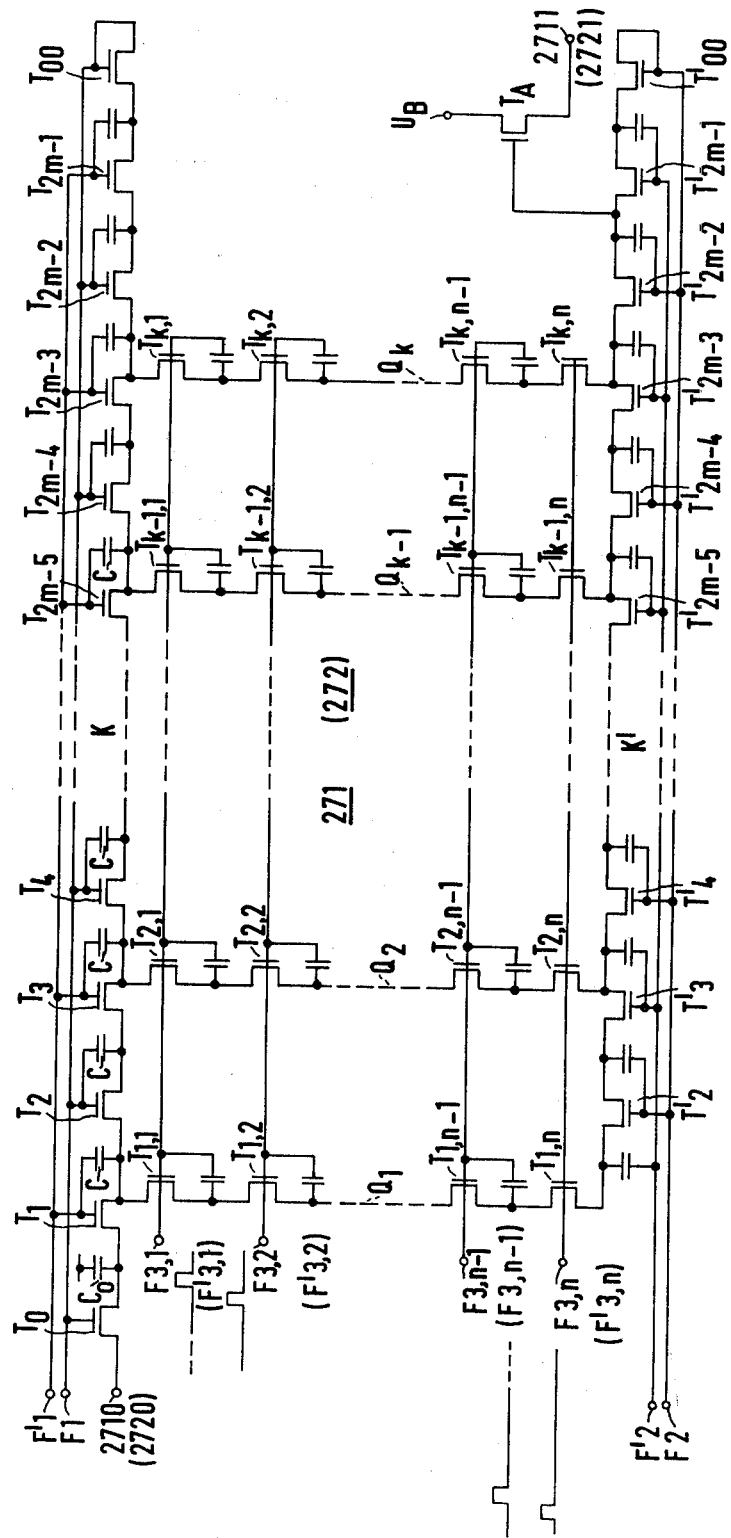
FIG. 3 is a circuit diagram of the preferably used partial storages of FIG. 2.

FIG. 3 shows the circuit diagram relating to one of the two identical partial storages 271 or 272. In this case there is a time-delay circuit designed in accordance with the charge transfer circuit principle. The term "charge transfer devices" includes on one hand, so-called bucket-brigade devices and, on the other hand, charge-coupled devices. The partial storage according to FIG. 3 is designed in accordance with the bucket-brigade principle, comprising a plurality of stages of the same kind each consisting of a transistor T ... and a capacitor C arranged between the control terminal and the collector terminal thereof, and which are connected in series in such a way that the collector terminal of the one is connected to the emitter terminal of the successively following transistor, with the control terminals of the even-numbered transistors being controlled by a portion of a rectangular or trapezoidal clock signal, and the control terminals of the odd-numbered transistors being controlled by a second portion of the rectangular or trapezoidal clock signal. The two portions of the clock signal are of equal frequency and in such a way assigned to one another that the effective pulses of the one portion fall within the gaps between the effective pulses of the respective other portion.

Bucket-brigade devices may be either designed to consist of discrete components or realized in the form of integrated circuits. As transistors there may be used bipolar transistors as well as field-effect transistors, and in the latter case it is of particular advantage to use insulated-gate field-effect transistors, hence to employ the so-called MOS technology for the integration purpose. The partial storage according to FIG. 3 consists of such insulated-gate field-effect transistors which are either of the p-channel or n-channel type, quite depending on what integration technology or what voltage polarity appears to be most suitable for the respective case of practical application. Likewise, it is possible to use field-effect transistors of either the enhancement or depletion type. It is noted that in the case of field-effect transistors the above-mentioned control terminal is the gate of the field-effect transistor and the above-mentioned collector terminal is the drain terminal.

FIG. 3, amongst others, shows the transistors $T_0$, $T_1$, $T_2$, $T_3$, $T_4$, $T_{2m-5}$, $T_{2m-4}$, $T_{2m-3}$, $T_{2m-2}$, $T_{2m-1}$ and $T_{00}$. These transistors are interconnected and arranged in series with the associated capacitors $C_0$, C in the way described hereinbefore. The even-numbered transistors $T_0$, $T_2$, $T_4$, $T_{2m-4}$, $T_{2m-2}$, $T_{00}$ are applied with their gate electrodes to the one portion of the first clock signal F1, and the odd-numbered transistors $T_1$, $T_3$, $T_{2m-5}$, $T_{2m-3}$, $T_{2m-1}$ are applied with their gate electrodes to the other portion of the first block signal F'1.

The two portions of this clock signal F1, F'1, as regards their shape as a function of time, consist of a rectangular and equi-frequency voltage referred to the zero point of the circuit (ground), with the amplitude of the one clock signal portion lying in the gap between the effective pulses of the other clock signal portion, and vice versa. Relative thereto, each clock signal portion may have a pulse duty factor of 0.5, but it is also possible to choose a pulse duty factor deviating from the aforementioned one, i.e. in such a way that gaps appear between the effective pulses of the two clock signal portions, during which both clock signal portions are zero.

The composite video signal of the further program II to be stored, is fed to the input 2710 or 2720 which is in connection with the controlled current path of the input transistor $T_0$. The other end of this current path is connected to the input capacitor $C_0$, whose other terminal is applied to the zero point of the circuit (ground).

The last transistor $T_{00}$ serves to terminate the bucket-brigade circuit with respect to direct current. In so doing, the one terminal of the controlled current path of the transistor $T_{00}$ is connected to its gate electrode.

In FIG. 3, the aforementioned components form the first longitudinal chain K. Moreover, FIG. 3 shows the transverse chains $Q_1$, $Q_2$, $Q_{k-1}$, $Q_k$, and the second longitudinal chain K'.

To each odd-numbered transistor in the first longitudinal chain K, hence to the transistors $T_1$, $T_3$, $T_{2m-5}$, $T_{2m-2}$ there is connected a transverse chain of identical stages, namely the transverse chains $Q_1$, $Q_2$, $Q_{k-1}$, $Q_k 1$. No transverse chain is connected to the transistor $T_{2m-1}$, because this is not a delaying transistor, but a transistor serving to terminate the line. Each of the transverse chains contains the same number of n stages, and, owing to the series arrangement of its individual stages, each time forms one bucket-brigade circuit.

The transistor gate electrodes of the same ordinal number n (n = 1,2 ...) in the k transverse chains are connected to one another and extend to one terminal for each time one of the auxiliary clock signals F3, ... . Thus, the auxiliary clock signal F3, 1 is applied to the transistors $T_{1-1}$, $T_{2,1}$, $T_{k-1,1}$, $T_{k,1}$ as the first transverse chain stages. The auxiliary clock signal F3,2 is applied to the transistors $T_{1,2}$, $T_{2,2}$, $T_{k-1,2}$, $T_{k-2}$ as the second transverse chain stages. The same also applies to the (n−1)th transverse chain transistors $T_{1,n-1}$, $T_{2,n-1}$, $T_{k-1,n-1}$ $T_{k,n-1}$, which are applied to the auxiliary clock signal F3,n−1, and to the n−th transverse chain stages employing the transistors $T_{1,n}$, $T_{2,n}$, $T_{k-1,n}$, $T_{k,n}$, as applied to the auxiliary clock signal F3,n.

The outputs of the individual transverse chains are connected to the second longitudinal chain K' which, as regards its design, is essentially identical to the design of the first longitudinal chain K. The second longitudinal chain K' contains the transistors $T_2'$, $T_3'$, $T_4'$, $T_{2m-5}'$, $T_{2m-4}'$, $T_{2m-3}'$, $T_{2m-2}'$, $T_{2m-1}'$, $T_{00}'$.

The outputs of the individual transverse chains are connected at the connecting point of the controlled current path of the respective odd-numbered transistor, to its associated capacitor in the second longitudinal chain K'. Thus, the output of the transverse chain $Q_1$ is connected to the terminal of the capacitor belonging to the first odd-numbered transistor, in which case, however, the first odd-numbered transistor in the second longitudinal chain K' corresponding to the first odd-numbered transistor $T_1$ in the first longitudinal chain K, is not required. The output of the second transverse chain $Q_2$, hence the transistor $T_{2,n}$ is applied to the point connecting the controlled current path of transistor $T_3'$ to the associated capacitor and, likewise, the corresponding outputs of the transverse chains $Q_{k-1}$, $Q_k$ with the transistors $T_{k-1,n}$, $T_{k,n}$ are applied to the transistors $T_{2m-5}'$, $T_{2m-3}'$.

The point connecting the controlled current paths of the last but one transistor $T_{2m-1}'$ and the last but two transistor $T_{2m-2}'$ controls the output transistor $T_A$ which, with its controlled current path, is arranged between the supply voltage $U_B$ and the output A while the transistor $T_{00}'$, owing to the connection of its gate terminal to the controlled current path, takes care of the direct current termination of the second longitudinal chain K'.

The second longitudinal chain K' is controlled by the second clock signal F2, F'2 which, as regards the shape of its curve, may be identical to that of the clock signal F1, F'1, but of higher frequency.

The n auxiliary clock signals F3,1, F3,2, F3,n−1, F3,n serve to activate the individual transverse chain stages one at a time in turn, as is denoted by the pulse scheme shown on the left in FIG. 3, in which the individual pulses are shown to be staggered in relation to one another and with respect to time, i.e. the n pulses of the auxiliary clock signals per clock pulse period, follow in a timely successive manner in direction from n to 1.

For serving as the third clock signal generator for generating the auxiliary clock signals F3, ... there are provided preferably the n-stage shift registers 401, 402 whose n parallel outputs are each connected to the n common terminals of the transverse chains of one of the partial storages 271, 272. These shift registers are operated in such a way that one single stage is set whose information is shifted accordingly in direction from the n-th to the first stage, controlled by the fourth clock signal F4, F'4.

Figure 4:
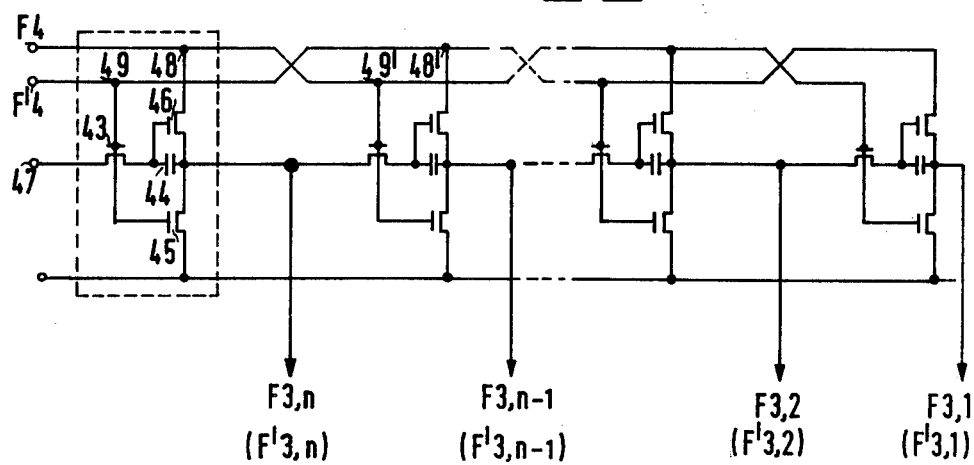
FIG. 4 shows the circuit diagram of a shift register serving as an auxiliary generator for generating clock signals which control the partial storages.

Some stages of this shift register 401 (402) which is likewise preferably realized in MOS technology, are shown in FIG. 4. This is a dynamic shift register which, for its operation, requires two non-overlapping clock signals. One of the stages shown in FIG. 4, is framed by a dashline. This stage contains the first switching transistor 45, which, on the one hand, is connected with the one end of its controlled current path to the zero point of the circuit (ground) and, on the other hand, with its other end to the controlled current path of the second switching transistor 46, with the free end of its controlled current path being applied to the first clock signal input 48 or 48' respectively.

The controlled current path of the coupling transistor 43 extends from the input 47 to the gate terminal of the second switching transistor 46, which, via the capacitor 44, is applied to the connecting point of the two switching transistors 45, 46, simultaneously representing the output of the respective stage. The gate terminals of the first switching transistor 45 and of the coupling transistor 43 are applied to the second clock signal input 49 or 49' respectively.

Successively following stages are in such a way controlled by the fourth clock signal F4, F'4 that the clock signal portion F4 will be fed to the first clock signal input 48 and to the second clock signal input 49' of two neighbouring stages, as well as to the second clock signal input 49, with the clock signal portion F'4 being fed to the first clock signal input 48' of the same neighbouring stages. In other words, the fourth clock signal F4, F'4 is each time applied to successively following stages by being crosswisely transposed.

The auxiliary clock signals F3,n; F3,n−1; F3,2; F3,1 are taken off the outputs of the respective stages.

The mode of operation of the arrangement according to FIG. 4 is as follows:

Assuming that the binary state HI defined by high potential, is applied to the input 47. This is transferred via the coupling capacitor 43 as driven into the conductive state by the clock signal portion F'4, to the gate terminal of the second switching transistor 46 and to the capacitor 44, thus causing the latter to be recharged. During the next clock signal half period during which the clock signal portion F4 is applied to the clock signal input 48, the second switching transistor 46 is thus driven into saturation by the charged capacitor 44, and the HI potential is applied to the output of the stage without having been inverted. In the course of this, the output signal, hence e.g. the signal F3,n, assumes the defined value of the amplitude of the clock signal portion F4.

At the next clock signal half period the potential at the output for F3,n is compelled to assume the LO-state which is defined by a lower potential, because the clock signal portion F4 as applied to the series arrangement of the two switching transistors 45, 46, likewise assumes its LO-state, thus causing the first switching transistor 45 to be unblocked when the second switching transistor 46 is blocked. Accordingly, in each stage a shifted HI- or LO-state is followed by a LO-state. In this way it is safeguarded that the duration of one HI-state cannot exceed one clock signal half period, thus automatically avoiding an overlapping.

During the clock signal half period directly following this shifting of the HI-state, in which an LO-state is shifted, the amplitude at the output, of course, is not equal to the potential of the zero point of the circuit, but undefined in a certain way. This is actually determined by the relationship between the capacitance $C_{44}$ of the capacitor 44 and the branch point (junction) capacitance $C_A$ of the circuit portion connected to the output, with the following applying in a good approximation:

$$U_{LO} = U_{HI} C_{44}/C_A,$$

wherein $U_{LO}$ indicates the voltage of the LO-state, and $U_{HI}$ indicating the voltage of the HI-state.

Of course, in the invention there is always provided for a sufficiently low amplitude $U_{LO}$, because a corresponding number of transverse chain stages according to FIG. 3 which are to be supplied with the auxiliary clock signals are connected to the respective outputs, so that the branch capacitance $C_A$ is high with respect to the capacitance $C_{44}$.

The negligible amplitude $U_{LO}$ according to the invention, always appears when a HI-state existed at the output two clock signal half periods earlier. In this case the still charged capacitor 44 of the following stage is discharged across the coupling transistor 43 back to the branch point capacitance $C_A$. This leads to the above mentioned capacitive voltage division according to the relationship $C_{44}/C_A$. The admissible value for $U_{LO}$ is determined by the fact that the voltage remaining at the capacitor 44 after the charge equalization, must be lower than the threshold voltage of the second switching transistor 46. In the next possible LO-state, however, this residual charge has completely disappeared.

Figure 5:
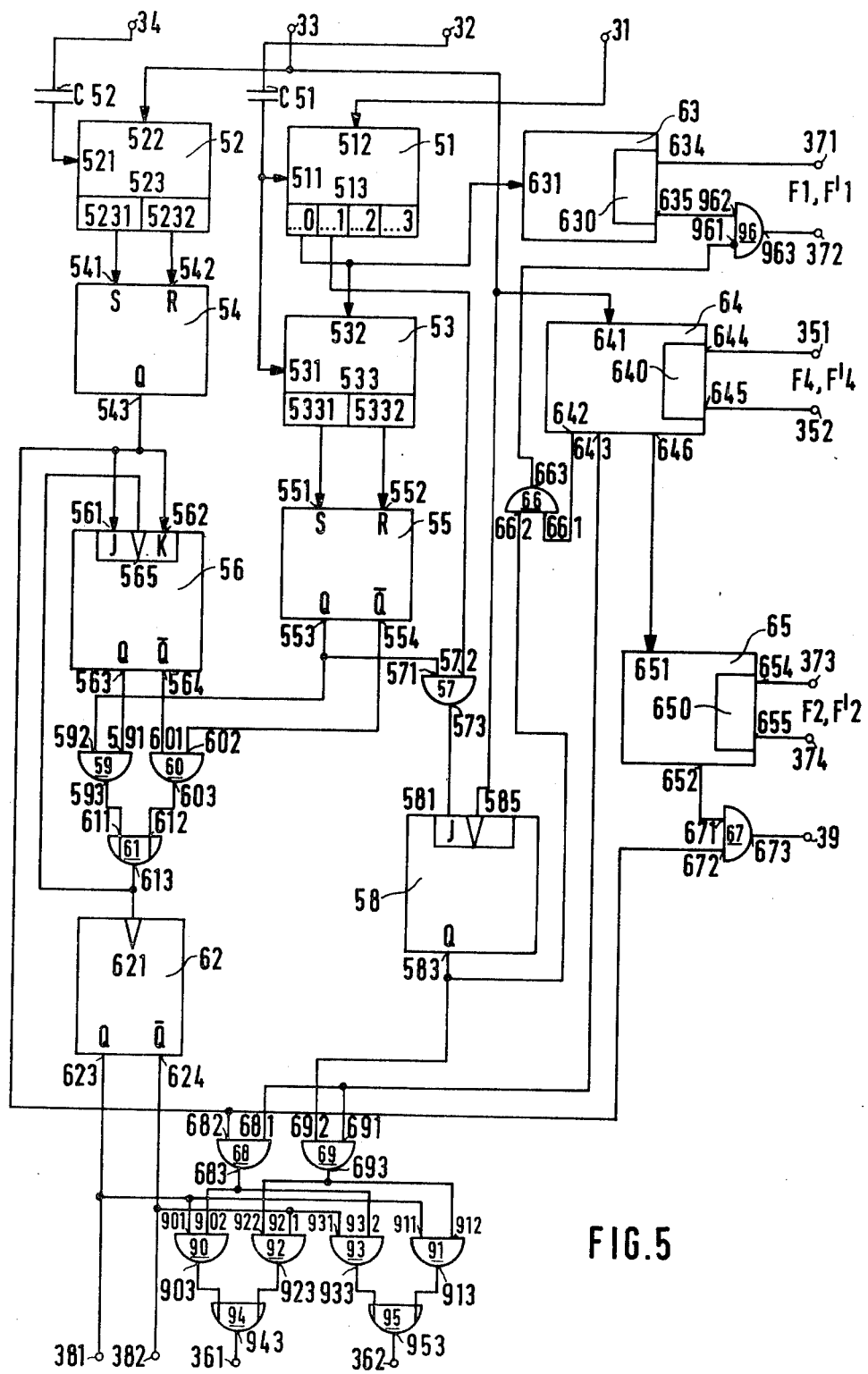
FIG. 5 is a block diagram of a preferably used logic circuit.

FIG. 5 shows the block diagram of a preferred type of embodiment of the logic circuit 30 which controls the partial storages 271, 272, the shift registers 401, 402 and the electronic switches 28, 29 in the way already described hereinbefore. This logic device contains a first counter 51 for counting the horizontal synchronizing pulses of the further program II, and whose counting capacity "a" is chosen thus that the reduced number of lines of the further program II which is to be stored, will result from "a"-times skipping successively following lines. Horizontal synchronizing pulses of the further program II are fed to the counter input 512 via the first input terminal 31. The vertical synchronizing pulses of the further program II, differentiated with the aid of capacitor C51, are applied to the reset input 511 via the second input terminal 32. The horizontal and vertical synchronizing pulses of the further program II as applied to the input terminals 31, 32, and as already mentioned in detail hereinbefore in connection with explaining the FIG. 2, originate with the output of the synchronizing pulse separating stage 26.

In the example of embodiment shown in FIG. 5, the first counter 51 has a counting capacity of a=4, i.e. the reduced number of lines of the further program II results from the fact that each fourth line of a field is provided for being stored in the partial storages 271, 272. Altogether these are 78 lines. Resetting with the aid of the vertical synchronizing pulses is necessary because 4.78=312 and, with the 625-line standard as customarily in use in Europe, the number of lines of one field amounts to 312.5, so that following each second field, the first counter 51 must count to five instead of to four, and thus always begins to count with the first line of a picture.

The second counter 52 serves to count the line flyback pulses of the first program I which are fed to its counting input 522 via the third input terminal 33. Instead of the line flyback pulses also other pulses which are practically in time coincidence with the line flyback pulses, may be applied to the input terminal 33, such as the pulses triggering the line flyback pulses in the horizontal deflection stage 7.

The counting capacity "b" of the second counter 52 corresponds to the number of lines of one field, hence to 312 lines when employing the aforementioned 625-line standard. The vertical synchronizing pulses of the first program I as differentiated via the capacitor C52, are applied to the reset input 521 of the counter 52 via the fourth input terminal 34. In this way it is achieved that with each field, the counter 52 will start to count with the first line of the field.

Moreover, the logic device 30 contains the third counter 53 for counting the reduced number of lines of the further program II, with the counting capacity "c" thereof being equal to the reduced number of lines, hence for example equal to the aforementioned number 78. Its counting input 532 is connected to one of the counter reading outputs 513 of the first counter 51, hence, as may be taken from the example of embodiment shown in FIG. 5, to the counter reading output 5130. To the reset input 531 of the counter 53, just as to the reset input 511 of the counter 51, the vertical synchronizing pulses of the further program II as differentiated with the aid of the capacitor C51, are applied from the input terminal 32. Accordingly, the counter 53 is reset simultaneously and for the same reasons as the counter 51 after a number of lines corresponding to one field.

The counter reading outputs 523 of the second counter 52 are determinative of the vertical position of the visible lines of the small-size picture with respect to the lines of the large-size picture. To two of these counter reading outputs 523 there is connected the S-input 541 and the R-input 542 of the first RS-flipflop 54. The position of the counter reading output 5231 as connected to the S-input 541 within all counter reading outputs 523 is determinative of the position of the first visible line of the small-size picture within the large-size picture on the screen 2. If, for example, the small-size picture is to appear in the proximity of the upper rim of the picture, the S-input 541 will have to be connected to one of the counter readings between 0 and approx. 40. If on the other hand, the small-size picture is to appear in the lower half of the large-size picture, the S-input 541 will have to be connected to a counter reading of approx. more than 150.

The counter reading output 5232 is determinative of the position of the first no longer visible line of the further program II. The position thereof is determined via the position of the counter reading output 5231 by adding the shown number of lines of the further program II, hence the number of lines of the small-size picture. If, for example, the small-size picture has a number of lines of 58 and if the counter reading output 5231 is at the counter reading 40, then the counter reading output 5232 will be at the counter reading 98.

The S-input 551 and the R-input 552 of the second RS-flipflop 55 are associated with two of the counter reading outputs 533 of the third counter 53. The position of the counter reading output 5331 as connected to the S-input 551, and the position of the counter reading output 5332 as connected to the R input 552 determine which of the lines of the further program II as resulting from the reduction in the number of lines, will actually become visible as a small-size picture. By assigning the counter reading outputs 5331, 5332 to corresponding counter readings, it is thus possible to make visible one image sector of the further program II in the form of a small-size picture. Of the lines of the further program II as selected by the reduction, only some initial and some end lines do not need to be made visible, because these lines, on the average, contain very little information of interest to the viewer. Moreover, by this line clipping at the upper and the lower rim of the picture of the further program II it is possible to save storage space in the partial storages 271, 272.

In the example of embodiment according to FIG. 5 in which every fourth line, hence the aforementioned 78 lines, are at first selected by the first counter 51, the counter reading output 5331 is at the counter reading 10, and the counter reading output 5332 is at the counter reading 68, that is, as already mentioned hereinbefore, there is displayed a 58-line small-size picture.

Both the J-input 561 and the K-input 562 of the first JK-flipflop 56 are connected in common to the Q-output 543 belonging to the S-input 541 of the first RS-flipflop 54.

The first input 571 of the first AND-gate 57 is applied to the Q-output 553 belonging to the S-input 551 of the second RS-flipflop 55 while the second input 572 thereof is applied to that particular counter reading output of the first counter 51 which is the next higher counter reading output connected to the counter input 532 of the third counter 53. Accordingly, in the example of embodiment as shown in FIG. 5, the input 572 is connected to the counter reading output 5131 which is the next higher one with respect to the counter reading output 5130.

The output 573 of the first ANDgate 57 is connected to the J-input 581 of the second JK-flip 58, to the clock pulse input 585 of which, via the input terminal 33, there are applied either the line flyback pulses of the first program I or corresponding pulses.

The first input 591 of the second AND-gate 59 is connected to the Q-output 563 belonging to the J-input 561 of the first JK-flipflop 56 while the second input 592 thereof is applied to the Q-output 553 belonging to the S-input 551 of the second RS-flipflop 55. In the same way both the first input 601 and the second input 602 of the third AND-gate 60 are associated with the $\overline{Q}$-output 564 as belonging to the K-input 562 of the JK-flipflop 56 or to the $\overline{Q}$-output 554 of the RS-flipflop 55 as belonging to the R-input 552, respectively.

Both the output 593 of the AND-gate 59 and the output 603 of the AND-gate 60 are connected to the inputs 611 or 612 of the first OR-gate 61 whose output 613 is applied to the clock pulse input 565 of the first JK-flipflop 56 and to the input 621 of the binary divider stage 62. One of the signals 381 or 382 as appearing at the Q- or $\overline{Q}$-outputs 623, 624 thereof, respectively, is used as the signal switching the first electronic switch 28 in FIG. 2.

The logic device 30, moreover, contains three triggered oscillators serving to generate the clock signals F1, F'1; F2, F'2 and F4, F'4 for the first and the second longitudinal chains, K, K' of the partial storages 271, 272 and for the shift registers 401, 402 associated therewith.

The first triggered oscillator 63 generates the first clock signal F1, F'1 driving the first longitudinal chains K of the partial storages 271, 272, whose frequency $f_1$ is equal to the product of the line frequency of the large-size picture and the number of storage positions of the first longitudinal chain necessary for storing one complete line. This condition applies to the frequency $f_1$ of the first clock signal F1, F'1 also when selecting less storage positions than are necessary for one complete line, which is of advantage with respect to suppressing the blanking interval. In an embodied circuit, the frequency was $f_1 = 1.5$ MHz. The trigger input 631 is applied to the counter reading output of the first counter 51 as connected to the counter input 532 of the third counter 53, hence in FIG. 5 to the counter reading output 5130. Accordingly, the first oscillator 63 only starts to oscillate upon reaching the selected line to be stored of the further program II, which thus has to be stored.

Moreover, and by means of the first preselecting counter 630 as contained in the triggered oscillator 63, following each triggering operation, and during the line duration of the further program II, there are generated d clock periods, with the number d being determined by the width of the small-size picture to be displayed. In the realized circuit embodiment, d amounted to 88. The signal as appearing at the output 634 of the first oscillator 63 is already the one phase or the one portion of the clock signal F1, F'1.

Moreover, the logic device 30 contains the second triggered oscillator 64 generating the fourth clock signal F4, F'4 for the shift registers 401, 402 of the two partial storages 271, 272.

To the trigger input 641 of the second oscillator 64 there are fed either the line (horizontal) flyback pulses of the first program I or the already mentioned pulses which are in time coincidence therewith. Accordingly, the second oscillator 64 always starts to oscillate when a line of the large-size picture is terminated and when a new one begins shortly thereafter. After each triggering, at least e clock periods are generated with the aid of the second preselecting counter 640, with e being equal to half the number of lines of the small-size picture.

In a good approximation, the frequency $f_4$ of the fourth clock signal is equal to e-times the reciprocal value of the portion of a line duration of the large-size picture lying between the left-hand rim portion of the large-size picture and the left-hand rim portion of the small-size picture, in other words, the horizontal position of the small-size picture is adjustable by selecting the frequency $f_4$ accordingly. In the designed circuit, in which the small-size picture is displayed in the right-hand lower quadrant of the screen 2, $f_4$ was approximately 750 kHz.

Accordingly, with the aforementioned 58 displayed lines of the small-size picture, and following each triggering by the line or horizontal flyback pulse of the first program I, there are generated at least 29 clock periods. In the designed circuit, there were 33 such clock periods. The clock signals F4, F'4 may be taken off the outputs 644, 645.

The third triggered oscillator 65 generates the second clock signal F2, F'2 for the second longitudinal chains K' of the partial storages 271, 272. This clock signal, accordingly, controls the read out of the respective information as stored in the partial storages 271, 272. The frequency $f_2$ of the clock signal is equal to the a-fold frequency $f_1$ of the first clock signal F1, F'1; accordingly, in the designed circuit, in which a equals four, the following applies: $f_2 = 4f_1 = 6$ MHz.

At the end of the last pulse of the e clock signals of the second oscillator 64, a trigger pulse is applied to the trigger input 651 of the third oscillator 65, by the trigger output 646 thereof. Following this triggering, and during the line duration of the further program II reduced by the blanking interval, g clock periods are generated with the aid of the third preselecting counter 650, with the number g at least corresponding to the number of storage positions of the second longitudinal chains K' of the partial storages 271, 272. In the already repeatedly mentioned designed circuit, g amounted to 66, and the number of storage positions to 64.

Finally, the logic circuit 30 still contains a number of AND or OR-gates serving to combine a number of signals generated by the hitherto described circuit portions, for generating further signals. Thus, the first input 661 of the fourth AND-gate 66 is applied to the first pulse output 642 of the second oscillator 64, which is actuated during the last clock period of the fourth clock signal F4, F'4. The second input 662 of the fourth AND-gate 66 is applied to the Q-output 583 belonging to the J-input 581 of the second JK-flipflop 58.

The fifth AND-gate 67, via its first and second input 671, 672, combines the pulse output 652 of the third oscillator 65 as activated for the time duration of the g clock-periods of this oscillator, with the Q-output 543 of the first RS-flipflop 54, as belonging to the S-input 541. The output 673 of the fifth AND-gate 67 is identical to the output 39 of the logic circuit 30 which, according to FIG. 2 is connected to the control input of the second electronic switch 29, i.e. the output signal of the fifth AND-gate determines at what times within a line of the large-size picture, a switching is to be effected from the output of the IF demodulator 42 to one of the outputs of the storage 27, so that the video amplifier 5 will receive the small-size picture information as stored in the storage 27, during the output signal of the fifth AND-gate 67, thus causing the small-size picture to be displayed on the screen 2 (FIG. 1).

The first inputs 681, 691 of both the sixth AND-gate 68 and the seventh AND-gate 69 are connected in common to the second pulse output 643 of the second oscillator 64, as activated during one of the first of the e clock periods of the fourth clock signal F4, F'4. The second input 682 of the sixth AND-gate 68 is applied to the Q-output 543 belonging to the S-input 541 of the first RS-flipflop 54, while the second input 692 of the seventh AND-gate 69 is applied to the Q-output 583 belonging to the J-input 581 of the second JK-flipflop 68.

The first inputs 901, 911 of the eighth AND-gate 90 and of the ninth AND-gate 91 are jointly connected to the Q-output 623 of the binary divider stage 62, and the first inputs 921, 931 of the tenth AND-gate 92 and of the eleventh AND-gate 93 are jointly connected to the $\overline{Q}$-output 624 of the binary divider stage 62. The second inputs 912, 922 of both the ninth and of the tenth AND-gate 91, 92 are jointly applied to the output 693 of the seventh AND-gate 69, and the second inputs 902, 932 of both the eighth and the eleventh AND-gate 90, 93 are applied to the output 683 of the sixth AND-gate 68. The outputs 903, 923 of the eighth and the tenth AND-gate 90, 92 are combined with one another via the second OR-gate 94, and the outputs 913, 933 of the ninth and the eleventh AND-gate 91, 93 are combined with one another via the third OR-gate 95.

The combination performed with the aid of the sixth to eleventh AND-gates and the second and third OR-gates generates at the outputs 943, 953 thereof each time one signal 361, 362 which is fed to the input 47 of the shift registers 401 or 402 as the information to be shifted in these shift registers. Accordingly, in this way the information as contained in the first longitudinal chains K of the two partial storages 271, 272 is shifted through the transverse chains up to the second longitudinal chains K', controlled by the fourth clock signal F4, F'4.

The inverting input 961 of the twelfth AND-gate 96 is connected to the output 663 of the fourth AND-gate 66 while the non-inverting input 962 of the twelfth AND-gate 96 is applied to the clock signal output 635 of the first oscillator 63. The output 963 of the twelfth AND-gate 96, together with the other clock signal output 634 of the first oscillator 63 represent the outputs 371, 372 for the first clock signal F1, F'1.

By the connection with the aid of the twelfth AND-gate 96 it is achieved that at the beginning of the transfer of the information as contained in the first longitudinal chains K of the partial storages 271, 272 into the transverse chains, each time the two clock signal phases of the first clock signal F1, F'1 will simultaneously assume the LO-state.

Figure 6:
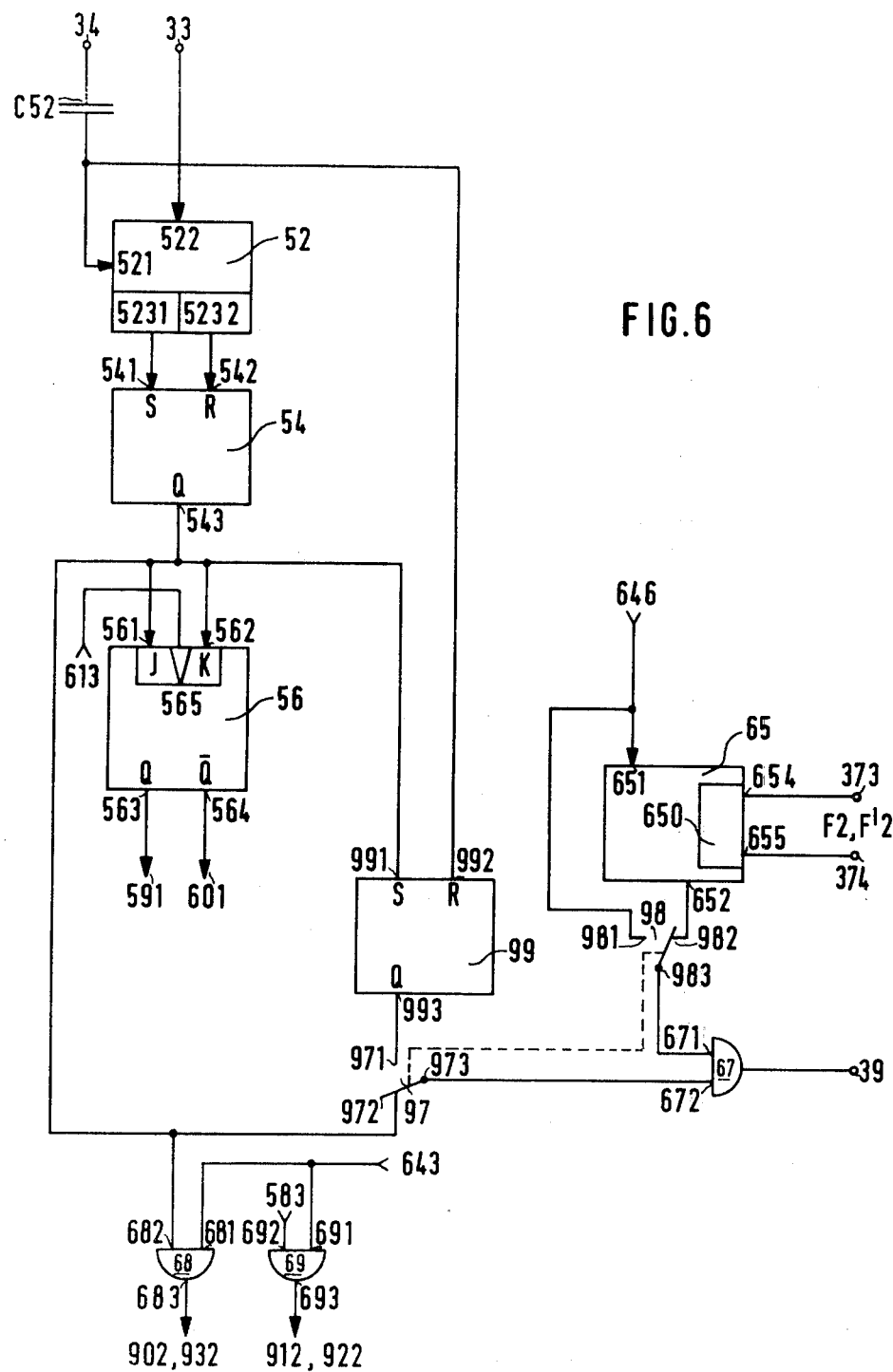
FIG. 6 is a block diagram of a further embodiment of the logic circuit according to FIG. 5.

FIG. 6 finally shows the block diagram of a modification or further embodiment of the logic circuit according to FIG. 5. By this further embodiment it becomes possible to effect the blanking of the portions of the large size picture lying on the right and below the displayed picture of the further program II, so that the small-size picture will appear to be framed on the right and below by a dark ambient field. This is accomplished by the first changeover switch 97 provided for in FIG. 6 in addition to the circuit portions according to FIG. 5, as well as by the second changeover switch 98 and the third RS-flipflop 99. For the sake of clarity, those circuit portions of FIG. 5 have been omitted in FIG. 6, which are not in a direct relationship with the additional circuit portions of FIG. 6; the lines extending to the omitted circuit portions, however, have been provided with the reference numerals of the corresponding circuit points.

The R-input 992 of the third RS-flipflop 99 is connected via the capacitor C52 to the input 34 for the vertical synchronizing pulses, that is, the R-input is also applied to the reset input 521 of the second counter 52.

The S-input 991 of the third RS-flipflop 99 is connected to the Q-output 534 belonging to the S-input 541 of the first RS-flipflop 54, and is thus also applied to the points of the circuit 561, 562, 682.

The first switch input 971 of the first changeover switch 97 is applied to the Q-output 993 belonging to the S-input 991 of the third RS-flipflop 99, while the second switch input 972 thereof is applied to the S-input 991 of the third RS-flipflop 99 and, consequently, also to the circuit points 543, 561, 562, 682. The switch output 973 of the first changeover switch 97 extends to the second input 672 of the fifth AND-gate 67, at the output 39 of which, as has been explained in greater detail hereinbefore, there is taken off the control signal for the second electronic switch device 29.

The first switch input 981 of the second changeover switch 98 is connected to the trigger output 646 of the second triggered oscillator 64 and, consequently, also to the trigger input 651 of the third triggered oscillator 65. The second switch input 982 of the second changeover switch 98 is connected to the pulse output 652 of the third triggered oscillator 65 while the switch output 983 is applied to the first input 671 of the fifth AND-gate 67.

The two changeover switches 97, 98 are to be switched in common from their first to their second switch inputs, as is indicated by the broken line in FIG. 6.

The switch position of the two changeover switches 97, 98 as shown in FIG. 6 corresponds to an operation similar to that in the arrangement according to FIG. 5, i.e. without the aforementioned black ambient field on the right and below the small-size picture. Accordingly, the other switch position corresponds to the operating mode with a black ambient field.

As changeover switches 97, 98 it is possible to use mechanical switches, but equally well also electronic switches may be used. The last-mentioned way of realization lends itself particularly in cases where the additional circuit portions according to FIG. 6 are provided for as well in an integrated circuit according to FIG. 5, and when the user of the integrated circuit, as regards the external wiring of a corresponding connection, is enabled to select the operating mode in the sense of a so-called option. The aforementioned external connection is then acted upon at will by one of two different potentials corresponding to the two operating modes.

By the additional circuit portions 97, 98, 99 it is accomplished, amongst others, that the third triggered oscillator 65, at an operation with a black ambient field at the end of the lines of the small-size picture, so to speak, continues to operate, hence is not stopped in the way as mentioned hereinbefore, after the g clock periods.

It has shown that this operating mode may also be of advantage in the case of an operation without a black ambient field, because in this way it is possible to save an external connection at the aforementioned integrated circuit. In this case, the operation with or without the black ambient field, will result from correspondingly controlling the second electronic switch 29 by the output signal of the fifth AND-gate 67, that is, the switch 29, during the operation without a black ambient field at the right-hand rim portion of the small-size picture, is immediately switched to the output of the IF demodulator 42 while during the operation with a black ambient field, this switching is only effected at the right-hand rim portion of the large-size picture.

During operation with the black ambient field, the portion thereof lying below the small-size picture will be generated in any case by correspondingly designing the output signal of the fifth AND-gate 67 with the aid of the additional circuit members according to FIG. 6.

When realizing the logic device according to FIGS. 5 and 6, it is of advantage to employ the MOS-technology for the storage 27 as well as for the shift registers 401, 402. Of course, the final (output) stages emitting the clock signals f1, F'1; F2, F'2; F4, F'4 should appropriately be realized with the aid of discrete or integrated bipolar circuits for power and voltage reasons.

We claim:

1. A television receiver for displaying a selected first program in the form of a large size picture and simultaneously displaying a further program in an image sector of the first program such that at least one image sector of the further program becomes visible on a screen in the form of a small size picture, said television receiver containing a storage device in which the picture contents of said further program, with a reduced number of lines, is first stored, with the aid of the filtered out vertical and horizontal synchronizing pulses, into defined storage positions and thereafter made visible at least partly in a corresponding position in said large size picture, comprising:
   a first tuner associated with said first program;
   a second tuner associated with said further program;
   a first IF stage coupled to the output of said first tuner;
   a second IF stage coupled with the output of said second tuner;
   a first IF demodulator coupled to the output of said first IF stage;
   a second IF demodulator coupled to the output of said second IF stage;
   first and second partial storages each having an input coupled to the output of said second IF demodulator;
   a first electronic switch having a first input coupled to the output of said first partial storage and a second input coupled to the output of said second partial storage;
   a second electronic switch having a first input coupled to the output of said first electronic switch and a second input coupled to the output of said first IF demodulator;
   a video-amplifier having an input coupled to the output of said second electronic switch; and
   logic means for controlling said first and second electronic switches and said first and second partial storages, said logic means responsive to the vertical and horizontal synchronizing pulses of said further program and to the vertical synchronizing pulses and the horizontal flyback pulses of said first program.

2. A television receiver according to claim 1 wherein each of said partial storages is a charge transfer time delay circuit comprising:
   a first longitudinal chain (K) of series connected identically designed stages operated in such a way by first clock signals (F1, F'1), that in one clock signal phase the even numbered stages of said first longitudinal chain contain an analog signal voltage while the odd number stages contain a neutral voltage value and, in a successively following clocked signal phase, the odd number stages contain an analog signal voltage value while the even number stages contain a neutral voltage value;

a plurality of transverse trains each coupled to alternate stages of said first longitudinal chain, each of said plurality of transverse trains comprising the same number (n) of series connected stages;

a second longitudinal chain (K') of series connected stages operated by second clock signals (F2, F'2); and a clock signal generator for generating auxilary clock signals F3, 1' F3,2; F3,n−1; F3,n) each of said n auxiliary clocks signals for controlling one of the n stages in said transverse chains.

3. A television receiver according to claim 2 wherein said first and second partial storages are operated by the same clock signals.

4. A television receiver according to claim 2 wherein said clock signal generator for each partial storage comprises an n-stage shift register whose n-parallel outputs are connected to the corresponding first, second, . . . n-stages of said transverse chains, said shift register controlled by fourth clock signals (F4, F'4), wherein each time one stage is set in said shift registers with this information being shifted in direction from the nth to the first transverse chain stages in the shift register.

5. A television receiver according to claim 4 wherein said shift registers are dynamic shift registers consisting of insulated gate field effect transistors of the same conductivity and control type, each stage of which comprises:

a coupling transister having one end of its controlled current path applied to an information input;

a first switching transistor having one end of its controlled current path coupled to the zero point of the circuit;

a second switching transister;

a capacitor, said second switching transistor and said capacitor coupled to both said first switching transistor and said coupling transister such that the series connected controlled paths of both said first and second switching transisters are arranged between the zero point of the circuit and a first clock signal input, said capacitor being arranged between the gate terminal of the second switching transistor and the connecting point of the two switching transisters forming the output of the stage, the end of the controlled current path of said coupling transister facing away from the input is arranged at the gate terminal of the second switching transistor, and the gate terminals of both the switching transistor and the coupling transistor are jointly applied to a second clock signal input, alternate stages of said shift registers being fed by one of the two portions of a fourth clock signal (F4, F'4).

6. A television receiver according to claim 1 wherein said logic means comprises:

a first counter for counting the line synchronizing pulses of said further program, said first counter having a counting capacity (a) such that the reduced number of lines of said further program to be stored results from a- timesskipping successively following lines, said first counter having a reset input coupled to the vertical input synchronizing pulses of said further program;

a second counter for counting the line flyback pulses of said first program, said second counter having a counting capacity (b) corresponding to the number of lines in one field, said second counter having a reset input coupled to the vertical synchronizing pulses of said first program;

a third counter for counting the reduced number of lines of said further program, said third counter having a counting capacity (c) equal to the reduced number of lines, the counting input of said third counter connected to a counter reading output of said first counter, said third counter having a reset input coupled to the vertical synchronizing pulses of said further program;

a first flipflop which is set at a particular one of the counter reading outputs of said second counter which determines the vertical position of the first visible line of the small size picture with respect to the lines of a large size picture, and resets at a particular one of the counter reading outputs of said second counter which determines the vertical position of the first line of said further program which is not visible with respect to the lines of the large size picture;

a third flipflop having an input jointly connected to the output of said first flipflop;

a first AND-gate having first and second inputs, said first input coupled to the output of said second flipflop and said second input coupled to a particular ounnter reading of said first counter which is the next higher one in relation to the counter reading output coupled to the counter input of said third counter;

a fourth flipflop having an input coupled to the output of said first AND-gate and having a clock input coupled to the line flyback pulses of said first program;

a second AND-gate having first and second inputs, said first input coupled to theoutput of said third flipflop and said second input coupled to the output of said second flipflop;

a third AND-gate having first and second inputs said first input coupled to the complementary output of said third flipflop and said second input coupled to the complementary output of said second flipflop;

a first OR-gate having first and second inputs, said first input coupled to the output of said second AND-gate and said second input coupled to the output of said third AND-gate, said first OR-gate having an output coupled to the clock input of said third flipflop;

a binary divider having an input coupled to the output of said first OR-gate;

a first preselecting counter;

a first triggered oscillator having a trigger input coupled to a counter reading output of said first counter as connected to the clock input of said third counter and which generates a first clock signal (F1, F'1), whose frequency (f1) is equal to both the product of the line frequency of the large size picture and the number of storage positions of the first longitudinal chain (K) of the partial storage necessary for storing one complete line, with d clock periods being generated after the triggering and during the line duration of the further program with the aid of the first preselecting counter;

a second preselecting counter;

a second triggered oscillator having a trigger input coupled to the line flyback pulses of said first program for generating fourth clock signals (F4, F'4) with at least e clock periods being generated after the triggering with the aid of said second preselecting counter, with e being equal to half the number of lines of the small size picture, and the frequency ($f_4$) of the fourth clock signal being approximately equal to e- times the reciprocal value of the portion of one line duration of said large size picture lying between the left-hand rim portion of said large size picture and a left-hand rim portion of said small size picture;

a third preselecting counter;

a third triggered oscillator having a trigger input coupled to a trigger pulse at the end of the last pulse of said e clock signals of said second oscillator, for generating a second clock signal ($F_2$, $F'_2$) whose frequency ($f_2$) is equal to a- times the frequency of said first clock signal, with g clock periods being generated after the triggering and during the line duration of said further program as reduced by the blanking interval by means of said third preselecting counter;

a fourth AND-gate having first and second inputs, said first input coupled to a first output of said second oscillator activated during the last clock period coupled to the output of said fourth flipflop;

a fifth AND-gate having first and second inputs, said first input coupled to a pulse output activated for the time duration of said g clock period of said third oscillator, said second input coupled to the output of said first flipflop;

sixth and seventh AND-gates each having first and second inputs the first input of each jointly applied to a second pulse output of said second oscillator which is activated during one of the first ones of the e clock period of the fourth clock period ($F_4$, $F'_4$), the second input of said sixth AND-gate coupled to the output of said first flipflop, and the second input of said seventh AND-gate coupled to the output of said fourth flipflop;

eighth, ninth, tenth and eleventh AND-gates each having two inputs, the first input of said eighth and ninth AND-gates jointly coupled to the output of said binary divider stage, the first input of said tenth and eleventh AND-gates jointly coupled to the complementary output of said binary divider stage, the second inputs of said ninth and tenth AND-gates jointly coupled to the output of seventh AND-gate and the second input of both the eithth and eleventh AND-gates coupled to the output of said sixth AND-gate;

a second OR-gate having first and second inputs, said first input coupled to the output of said eighth AND-gate and said second input coupled to the output of said tenth AND-gate.

a third OR-gate having first and second inputs, said first input coupled to the output of said ninth AND-gate and said second input coupled to the output of said eleventh AND-gate; and a twelvth AND-gate having a first inverting input and a second non-inverting input, said non-inverting input coupled to one of the two clock signal outputs of said first oscillator, said inverting input coupled to the output of said fourth AND-gate wherein one of the output signals of said binary divider stage controls said first electronic switch, the output of said fifth AND-gate controls said second electronic switch, the output of said twelvth AND-gate and the other clock signal output of said first oscillator serves as outputs of said first clock signal, ($F_1$, $F'_1$), the output signal of said second OR-gate is shifted into the shift register corresponding to the first partial storage, and the output of said third OR-gate is shifted into the shift register corresponding to said second partial storage.

7. A television receiver according to claim 6 wherein said logic circuit further includes:

a capacitor;

an RS flipflop having an R input coupled via said capacitor to the input for the vertical synchronizing pulses of said first program, and having an S input coupled to the output of said first flipflop;

a first changeover switch whose first switch input is coupled to the output of said third RS flipflop whose second switch input is coupled to the S input of said RS flipflop and whose switch output is applied to the second input of said fifth AND-gate; and a second changeover switch having a first switch input coupled to the trigger output of said second triggered oscillator, a second switch input coupled to the pulse output of said third triggered oscillator, and a switch output coupled to the first input of said fifth AND-gate, said first and second changeover switches capable of being switched only in common from their respective first switch inputs to their respective second switch inputs.

8. A television receiver according to claim 1 wherein the tuner associated with said further program and the corresponding IF stage are dimensioned to be so narrow banded so as to suppress the color subcarrier frequency as contained in the signal received from a sender.

9. A television receiver according to claim 1 wherein when using the tuner associated with said further program and the corresponding IF stage having the same band with as the tuner and the IF stage of the said first program, the respective input of the two partial storages are connected to the output of the RF stage associated with said further program through a filter suppressing the color sub-carrier frequency.

10. A television receiver according to claim 9 wherein said filter is a low pass filter.

* * * * *